Patented Nov. 28, 1939

2,181,411

UNITED STATES PATENT OFFICE 2,181,411

CHLORINATION OF NITROMETHANE

Byron M. Vanderbilt, Terre Haute, Ind., assignor to Commercial Solvents Corporation, Terre Haute, Ind., a corporation of Maryland No Drawing. Application February 10, 1938, Serial No. 189,763

10 Claims. (Cl. 260—644)

My invention relates to the chlorination of nitromethane, and particularly to improved methods of producing chloropicrin therefrom.

An object of my invention is to produce consistent high yields of chloronitromethane, and particularly trichloronitromethane, commonly known as chloropicrin, from nitromethane. Another object is to produce chloropicrin from nitromethane in a practical recoverable form less subject to decolorization than chloropicrin produced by previous methods. Another object is the production of chloropicrin without the simultaneous liberation of large volumes of gaseous materials, thus obviating the necessity of costly recovery systems in order to prevent loss of the chlorination products as well as the liberation of these toxic materials into the air. Other objects will be evident from the discussion which follows.

In the past, chloronitroparaffins have been produced by passing gaseous chlorine into an aqueous solution of the sodium salt of the nitroparaffin. More recently, Ramage (U. S. Patent 1,996,388, granted April 2, 1935) has disclosed a process for the production of chloropicrin which consists in adding nitromethane to a hypochlorous acid solution, buffered to maintain a substantially constant pH value favorable to the existence of hypochlorous acid, that is, preferably, about pH=6. Although Ramage claims high yields, strict observance of his operating directions has not given satisfactory yields; little, if any, chlorination ordinarily being effected by hypochlorous acid solution containing no hypochlorite. The procedure described by Ramage is subject to the additional disadvantage of requiring the presence of very large volumes of water in order to obtain the hypochlorous acid in solution on account of the instability of the latter in concentrated solutions. My process is subject to neither of these disadvantages inasmuch as I am able to produce consistently higher yields of chloropicrin as well as monochloronitromethane, if desired, than have been obtainable by following Ramage's or other prior processes. In addition, my process requires the presence of only relatively small amounts of water, thus requiring the use of equipment of smaller volume and at the same time greatly facilitating the recovery of the chloronitromethanes in a pure form.

I have now discovered that improved yields of the chloronitromethanes, and particularly chloropicrin, can be obtained by effecting the chlorination of nitromethane with inorganic hypochlorites instead of hypochlorous acid as claimed by Ramage. By varying the proportions of hypochlorite used, I am able to obtain mono-, and trichloronitromethanes.

Inorganic hypochlorites are ordinarily obtained by reacting chlorine and a base in an aqueous medium. In order to stabilize the hypochlorite the presence of an excess of base is required. Both nitromethane and monochloronitromethane are unstable in the presence of aqueous alkalies and hence inorganic hypochlorite solutions obtained in the customary manner are not best suited for chlorinating nitromethane. The most satisfactory results when chlorinating nitromethane with inorganic hypochlorites are obtained when the hypochlorite is prepared in the presence of nitromethane with which it immediately reacts and accordingly requires no stabilizing agent. This may be accomplished, for example, either by producing the hypochlorite in a nitromethane solution suitably buffered to obviate excessive alkalinity in the solution, or by introducing into the nitromethane solution chlorine and a base at such a rate that an equivalent amount or a slight excess of chlorine is always present in the solution or at least until the chlorination is substantially complete. Obviously, sufficient water should be present with the nitromethane or always be introduced with the chlorine or base, to permit the initial reaction between the chlorine and the base to form the hypochlorite, which in turn reacts with the nitromethane. It is desirable to have sufficient water present to dissolve the metallic chloride which is a by-product in the reaction. However, the amount required is relatively small as compared with the very large amount required to produce the hypochlorous acid solution required in Ramage's process.

In addition to the water, it is desirable also to have present in the chlorination reaction medium a solvent inert under the conditions of the reaction which will serve to keep the nitromethane and the resulting chlorinated products out of the aqueous solution and thereby reduce the tendency for their decomposition. The operation is facilitated considerably if this solvent also dissolves chlorine. Carbon tetrachloride is an example of a suitable solvent of this type. Chloropicrin, likewise, may be used and is particularly suitable when chloropicrin is the desired end product of the chlorination process and the presence of a difficultly separable solvent would complicate the recovery of the reaction products. When my process is carried out in the presence of such a solvent, the undesirable evolution of hydrochloric acid, chlorine, carbon dioxide or other gas is avoided, thereby eliminating to a large extent losses of products as well as the necessity for recovery systems required when working with toxic materials such as chlorine, chloropicrin, etc.

My process will be illustrated by the following specific examples:

*Example I*

To 244 parts by weight of nitromethane (4 moles) and 50 parts by weight of water cooled to below 25° C. was added simultaneously 71 parts chlorine (1 mole) and 40 parts of sodium hydroxide as a 5.3779 normal solution (1 mole), the chlorine and sodium hydroxide being added in such a manner that the sodium hydroxide was never in excess over the chlorine in the reaction mixture. At the conclusion of the reaction the oil layer was separated, washed with saturated sodium chloride solution, dried, and fractionated. A yield of 35% monochloronitromethane was obtained on the basis of the chlorine. The remainder of the chlorine was converted principally to chloropicrin.

*Example II*

A mixture consisting of 31 parts nitromethane (0.5 mole), 150 parts carbon tetrachloride, and 150 parts water was prepared, externally cooled to 15–20° C., and gently agitated while adding 6 parts of chlorine. Then a total of 117 parts (10% excess) of chlorine and 60 parts of sodium hydroxide of 5.303 normal solution were added simultaneously in molecular proportions over a period of 2 hours. The chloropicrin—carbon tetrachloride layer was recovered by layer separation, washed, and dried. The chloropicrin was then obtained by distillation of the resulting product. The yield amounted to 84% of the theoretical.

*Example III*

Example II was repeated, substituting 150 parts of pure chloropicrin for the carbon tetrachloride. A yield of 81.5% of chloropicrin based on the theoretical was obtained as a result of the chlorination of the nitromethane.

*Example IV*

A mixture consisting of 31 parts nitromethane (0.5 mole), 15.9 parts sodium carbonate (0.15 mole) and 150 parts water was prepared, cooled to 15–20° C. and chlorine slowly added. The chlorine first reacted with the sodium carbonate as indicated by the equation:

$$2Na_2CO_3 + Cl_2 + H_2O \rightarrow 2NaHCO_3 + NaOCl + NaCl$$

When sufficient chlorine had been added to convert one-half of the sodium carbonate to sodium bicarbonate, chlorine and 4.71 normal sodium hydroxide solution were added simultaneously, mole for mole, until a total of 122.5 parts chlorine and 69 parts sodium hydroxide solution (15% excess of each) had been added during the period of 2½ hours. Since as long as sodium carbonate is available in the solution the available chlorine is entirely present as the hypochlorite, the solution remained the intense reddish-brown color characteristic of hypochlorite solutions, until the addition of the chlorine was nearly complete. After the addition of the chlorine was complete, the reaction mixture separated into two layers, the aqueous layer of which was removed and washed with carbon tetrachloride and the latter then added to the oil layer and the whole dried with calcium chloride. On subsequent distillation the chloropicrin was obtained in pure form.

The yield of chloropicrin obtained in accordance with the above procedure was 71% of the theoretical.

On repeating this experiment in the presence of 150 parts by weight of carbon tetrachloride, the yield of chloropicrin was 77% of the theoretical.

*Example V*

A mixture consisting of 31 parts nitromethane (0.5 mole), 150 parts carbon tetrachloride, and 150 parts water was cooled to 15–20° C. Six parts of chlorine were then added while gently agitating. Next a total of 117 parts (10% excess) of chlorine and 61 parts of hydrated lime were added simultaneously in molecular amounts over a period of two hours. The yield of chloropicrin was 84% of the theoretical.

By following the same general procedure described in the preceding examples, varying only the proportions of reactants, the monochloronitromethanes may be obtained along with chloropicrin. This is illustrated by the following example.

*Example VI*

A mixture consisting of 122 parts of nitromethane (2 moles), 50 parts carbon tetrachloride, and 100 parts water was cooled to 15–20° C. and while agitating 71 parts chlorine (1 mole) and 40 parts of sodium hydroxide as a 4.71 normal solution were simultaneously added over a period of 1 hour in a manner so as to maintain a slight excess of chlorine over sodium hydroxide at all times until the reaction was substantially complete. At the end of the reaction, the reaction products separated into two layers, the water layer of which was washed with ether and the ether washings combined with the oil layer which was then dried and fractionated. A yield of 24% monochloronitromethane (on the basis of the chlorine), in addition to an undetermined amount of trichloronitromethane also present, was obtained.

On repeating the above operation using 200% excess of nitromethane, a yield of 31% monochloronitromethane was obtained on the basis of the chlorine, or approximately 68% on the basis of the nitromethane.

In the examples cited above only sodium and calcium hypochlorites have been employed as chlorinating agents. My process, however, is not limited to these materials as I may use metallic hypochlorites generally so long as the particular one used causes no undesired side reactions with either the nitromethane or the chlorinated products thereof or which does not produce in the reaction medium conditions unfavorable for optimum yields, as for example, a strongly alkaline reaction. As a matter of convenience and economy, I prefer to use the alkali or alkaline earth metal hypochlorites.

The procedures shown in the examples may also be modified in a number of ways. For example, the nitromethane, chlorine, and base may be simultaneously added to an aqueous or aqueous-solvent medium at the rates required to produce the hypochlorite required to chlorinate the nitromethane being added and at the same time leave no substantial excess of strong base in the reaction mixture. According to another modification, the reaction mixture may contain as a buffer a bicarbonate instead of a carbonate, as shown in the example, in which case an initial small addition of base is first made and then this is followed by the simultaneous addition of chlorine and base in a manner so as to maintain a slight excess of the normal carbonate in the reaction medium. Still another modification consists in dissolving the nitromethane in carbon tetrachloride or other suitable solvent and partially saturating the resulting mixture with chlorine before beginning the addition of equivalent amounts of chlorine and base. If desired, also, the base may be added in anhydrous form instead of in solution, provided the reaction medium contains sufficient water for the formation of the hypochlorite from the chlorine and base. Other modifications in operating procedure will naturally occur to one skilled in the art. It is understood, therefore, that my process is not limited to any particular method for obtaining hypochlorites but only to the use of such compounds in the chlorination of nitromethane in the absence of substantial amounts of free strong bases.

What I claim is:

1. In a process for the chlorination of nitromethane, the step which comprises treating an aqueous solution of nitromethane with a chlorinating medium comprising essentially chlorine and a metal hypochlorite of the class consisting of alkali and alkaline earth hypochlorites, in which said chlorine is present in sufficient amounts to convert all of the metal hydroxide, formed by the action of said hypochlorite or nitromethane, into the corresponding hypochlorite.

2. In a process for the chlorination of nitromethane, the step which comprises producing metal hypochlorites of the class consisting of alkali and alkaline earth metal hypochlorites in a medium containing nitromethane and a solvent for chlorine and said nitromethane, under conditions such that the chlorine is present in sufficient amount to convert all of the metal hydroxide, formed by the action of said hypochlorite on nitromethane, into the corresponding hypochlorite, thus preventing the formation of cleavage products of nitromethane and chlorination products thereof.

3. In a process for the chlorination of nitromethane, the step which comprises producing metal hypochlorites of the class consisting of alkali and alkaline earth metal hypochlorites in a medium containing nitromethane and a solvent for chlorine and said nitromethane selected from the group consisting of carbon tetrachloride and chloropicrin, under conditions such that chlorine is present in sufficient amount to convert all of the metal hydroxide, formed by the action of said hypochlorite on nitromethane, into the corresponding hypochlorite, thus preventing the formation of cleavage products of nitromethane and chlorination products thereof.

4. In a process for the chlorination of nitromethane, the step which comprises producing metal hypochlorites of the class consisting of alkali and alkaline earth metal hypochlorites in a medium containing nitromethane under conditions such that chlorine is present in sufficient amount to convert all of the metal hydroxide, formed by the action of said hypochlorites on nitromethane, into the corresponding hypochlorite, thus preventing the formation of cleavage products of nitromethane and chlorination products thereof.

5. In a process for the chlorination of nitromethane, the step which comprises producing sodium hypochlorite in an aqueous nitromethane medium, under conditions such that chlorine is present in sufficient amounts to reconvert all of the sodium hydroxide, formed by the action of said hypochlorite on nitromethane, into sodium hypochlorite.

6. In a process for the chlorination of nitromethane, the step which comprises producing sodium hypochlorite in an aqueous nitromethane medium containing a solvent for chlorine, said nitromethane and the chloronitromethanes, under conditions such that chlorine is present in sufficient amounts to reconvert all of the sodium hydroxide, formed by the action of said hypochlorite on nitromethane, into sodium hypochlorite.

7. In a process for the chlorination of nitromethane, the step which comprises producing calcium hypochlorite in an aqueous nitromethane medium, under conditions such that chlorine is present in sufficient amounts to reconvert all of the calcium hydroxide, formed by the action of said hypochlorite on nitromethane, into calcium hypochlorite.

8. In a process for the chlorination of nitromethane, the step which comprises producing calcium hypochlorite in an aqueous nitromethane medium containing a solvent for chlorine, said nitromethane and the chloronitromethanes, under conditions such that chlorine is present in sufficient amounts to reconvert all of the calcium hydroxide, formed by the action of said hypochlorite on nitromethane, into calcium hypochlorite.

9. In a process for the chlorination of nitromethane, the step which comprises adding to aqueous nitromethane a metal hydroxide of the class consisting of alkali and alkaline earth metal hydroxides and simultaneously therewith chlorine in such a manner that the chlorine is in excess of said metal hydroxide until the reaction is substantially complete.

10. In a process for the chlorination of nitromethane, the step which comprises adding to aqueous nitromethane containing a solvent for chlorine and said nitromethane a metal hydroxide of the class consisting of alkali and alkaline earth metal hydroxides and simultaneously therewith chlorine in such a manner that the chlorine is in excess of said metal hydroxide until the reaction is substantially complete.

BYRON M. VANDERBILT.